United States Patent Office 3,190,897
Patented June 22, 1965

3,190,897
$\Delta^{1,4,6}$-PREGNATRIENES AND INTERMEDIATES USEFUL IN THE PREPARATION THEREOF
Eugene J. Agnello and Gerald D. Laubach, Jackson Heights, N.Y., assignors to Chas. Pfizer & Co., Inc., New York, N.Y., a corporation of Delaware
No Drawing. Filed July 5, 1957, Ser. No. 669,970
8 Claims. (Cl. 260—397.45)

This application is a continuation-in-part of earlier filed patent application, Serial No. 486,682, filed February 7, 1955, now abandoned.

This application is concerned with novel steroid compounds useful because of their biological activity as adrenocortical hormones per se, or because they are intermediates in the preparation of compounds of known adrenocortical activity. It is concerned also with the process by which these valuable compounds are prepared.

The biologically active compounds of this invention are represented by the formulas:

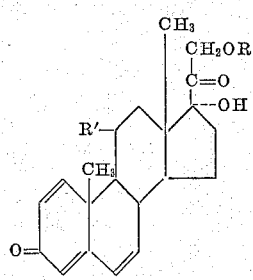

and

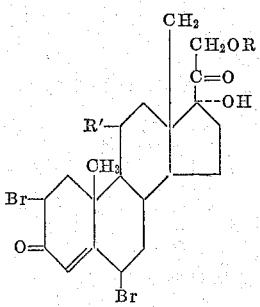

wherein R is hydrogen or an acyl hydrocarbon containing up to eight carbon atoms and R' is β-hydroxyl or keto. In other compounds within the purview of the instant invention, principally useful because they are intermediates in the preparation of biologically active compounds, R' is hydrogen or α-hydroxyl.

The starting compounds for the preparation of the compounds of this invention include Compound F, epi-Compound F, Compound E and Compound S. These compounds are also known as hydrocortisone, epi-hydrocortisone, cortisone and 11-desoxycortisone.

In carrying out the process of the instant invention, the starting material is first treated with bromine. A small amount of hydrogen bromide catalyst is helpful during this reaction. This results in the introduction of one bromine atom at the 6-position, and another at the 2-position. The 2,6-dibromine compound is then dehydrobrominated by treatment with an organic base, preferably collidine. This results in the formation of compounds having double bonds at the 1, 4 and 6-positions. Treatment of the triene compound with zinc and acetic acid, preferably in the presence of ascorbic acid, results in the selective reduction of the 6-position double bond, yielding the desired 1,4-diene. This hydrogenation of the 6-position double bond may also be accomplished by catalytic hydrogenation over palladium supported on calcium carbonate in a solvent such as ethyl acetate. If the 21-position hydroxyl group has been protected as an ester throughout these reactions, the free alcohol is then obtained by hydrolysis, for example, using a weak base such as sodium bicarbonate.

When the original starting material contained only hydrogen at the 11-position, the useful intermediate obtained is readily converted to a biologically active compound containing an 11β-hydroxyl group by treatment with Curvularia according to the method of U.S. Patent 2,658,023. This reaction is the subject matter of copending application, Serial No. 486,683, filed on February 7, 1955, now abandoned.

When the original starting material contained an 11α-hydroxyl group, the useful intermediate obtained is readily converted to a biologically active compound containing an 11-keto group by careful oxidation, for example, by the two phase (aqueous acetic acid-chlorobenzene) chromic acid method, or by the chromic acid-pyridine method.

In place of collidine, other organic bases may be used for the dehydrobromination step. These include, for example, pyridine, 2,4-lutidine and 2,6-lutidine. In general, the tertiary amines having fairly high boiling points give best results but other organic bases may also be employed.

The addition of ascorbic acid during the reduction step with zinc and acetic acid is helpful as the ascorbic acid acts as an antioxidant. Its presence is not essential, however.

Although the reactions described above are applicable to compounds in which the 21-position carries a free hydroxyl group, for optimum results it is best that the hydroxyl group be acylated with an acyl hydrocarbon group containing up to eight carbon atoms. The term, "acyl hydrocarbon," includes acyl hydrocarbon groups containing only carbon, hydrogen and oxygen derived from monocarboxylic and dicarboxylic acids. In the event that the acyl hydrocarbon group chosen is one derived from a dicarboxylic acid, it is often advantageous to treat the isolated compound with a base derived from an alkali metal or alkaline earth metal to prepare a metal salt. The usefulness of the biologically active compounds of this invention is enhanced by forming metal salts since the latter possess increased water solubility. Useful bases include, for example, sodium, potassium, barium and calcium hydroxide as well as the corresponding carbonates and bicarbonates.

Since the 21-position hydroxyl group is the only primary alcohol group present in any of the molecules whether starting material, intermediate or product, it may be readily esterified by standard methods. Although Fischer esterification and transesterification procedures may be employed, in general, it is preferred to form the esters by treatment with an acylating agent such as an acyl halide or anhydride in the presence of a tertiary base such as pyridine or dimethylaniline. Free 21-alcohols are prepared from the corresponding esters by gentle hydrolysis, for example, by treatment with dilute hydrogen chloride in aqueous methanol.

The biologically active compounds of this invention may be administered alone or in combination with acceptable pharmaceutical carriers, the choice of which is determined by the preferred route of administration, the solubility of the compound and standard pharmaceutical practice. In general, the dosage of these compounds is of approximately the same order of magnitude as the dosage of hydrocortisone, and these compounds are useful to treat the types of pathological conditions often treated with hydrocortisone. Because of their great adrenocortical activity it is sometimes possible to use dosages of these compounds which are lower than those of hydrocortisone.

For oral administration the compounds may be administered in the form of tablets containing such excipients as starch or milk sugar. Aqueous suspensions and elixirs which may be sweetened or flavored may also be used. To apply these therapeutic agents topically, they may be prepared in the form of ointments and salves in suitable bases especially non-aqueous petrolatum type bases. For intra-articular injection aqueous suspensions may be employed. In this case various suspending and wetting agents may be added to the compositions to obtain a suspension not tending to settle out easily or to pack down in the bottle in which it is stored. Intramuscular and subcutaneous dosage forms may also be prepared by standard pharmaceutical practice.

The following examples are given solely for the purpose of illustration and are not to be construed as limitations of this invention, many apparent variations of which are possible without departing from the spirit or scope thereof.

EXAMPLE I

Ten grams of Compound F-21-acetate was dissolved in 3 l. of glacial acetic acid. Three drops of hydrogen bromide were added and 8.8 g. (10% excess) of bromine dissolved in 100 ml. of glacial acetic acid was then added. After standing at room temperature for twelve hours, the mixture was diluted with water and filtered. The recovered precipitate was $\Delta^4$-pregnene-2,6-dibromo-11$\beta$,17$\alpha$-21-triol-3,20-dione-21-acetate.

Four grams of this compound was refluxed for one hour with 25 ml. of collidine. The resulting mixture was then made slightly acidic with dilute hydrochloric acid and then extracted with chloroform. The chloroform extract was washed with water, dried over anhydrous magnesium sulfate, and evaporated to dryness. The product was identified as $\Delta^{1,4,6}$-pregnatriene-11$\beta$,17$\alpha$,21-triol-3,20-dione-21-acetate.

Two grams of this compound was dissolved in 100 ml. of acetic acid. A half gram of ascorbic acid was added. Three grams of mossy zinc was added, and the reaction was allowed to proceed at room temperature for one hour. The mixture was then carefully poured into ice cold water and filtered. The filtrate was extracted with chloroform, and the extract washed with water, dried over anhydrous magnesium sulfate and evaporated to dryness. The product was $\Delta^{1,4}$-pregnadiene-11$\beta$,17$\alpha$,21-triol-3,20-dione-21-acetate. This same product was also produced from the same starting material by catalytic hydrogenation over Pd(CaCO$_3$) dissolved in ethyl acetate. This hydrogenation was stopped after the addition of one mole of hydrogen.

The free alcohol was prepared from the acetate by hydrolysis at room temperature with hydrogen chloride dissolved in aqueous methanol.

EXAMPLE II

The procedure of Example I was repeated, except that in place of Compound F-21-acetate, each of the 21-acetates of epi-Compound F, cortisone and Compound S was used as the starting material. In each case, the result was the same as that in Example I. The same sequences of reactions were also carried out using esters other than acetate to protect the 21-hydroxyl. Propionate, for example, also worked.

EXAMPLE III

The novel compounds of this invention have only one primary alcohol group in each molecule, i.e., the 21-position group. This was readily esterified to form esters of the steroid alcohol and of any of a variety of organic acids, including those with straight, branched, saturated, unsaturated and cyclic carbon chains. In the case of polycarboxylic acids, acid esters were formed. The alkali metal salts of these acid esters were water soluble. By procedures analogous to the following, using either the acid halide or acid anhydride, esters of, for example, acetic acid, propionic acid, butyric acid, trimethylacetic acid, cyclopentylpropionic acid, undecenoic acid, benzoic acid, cyclohexane carboxylic acid, oxalic acid, malonic acid, succinic acid, phthalic acid, and stearic acid were formed from the novel steroid alcohols of this invention. Fischer esterification and transesterification procedures also worked.

Ten millimoles of $\Delta^{1,4}$-pregnadiene-11$\beta$,17$\alpha$,21-triol-3,20-dione was dissolved in 6 ml. of freshly distilled pyridine and the solution was chilled to 0° C. 1.1 molar equivalents of propionyl chloride was added dropwise, and the mixture was allowed to stand ten hours at room temperature. The mixture was added slowly to 100 ml. of ice cold 3 N sulfuric acid and extracted three times with choroform. The extracts were combined, washed successively with 1 N sulfuric acid, aqueous sodium bicarbonate, and water. The chloroform solution was then filtered through a supercel precoated funnel, dried over sodium sulfate, and concentrated to dryness in vacuum. Crystals of the ester were obtained upon trituration of the crude residue. A purified sample was prepared by recrystallization from methanol.

EXAMPLE IV $\Delta^{1,4,6}$ - pregatriene - 17$\alpha$,21 - diol - 3,11,20 - trione - 21-acetate A solution of 3:1 acetic acid-water (10 cc.) containing 100 mg. of chromic oxide per cc. of solution is added with stirring to 2 g. of $\Delta^{1,4,6}$-pregnatriene-11$\alpha$,17$\alpha$,21-triol-3,20-dione 21-acetate in 20 cc. of chlorobenzene. The two phase system is stirred vigorously for eight hours, and at the end of this period, the excess chromic acid decomposed by the addition of 10 cc. of methanol. The layers are separated and the aqueous phase extracted with two 5 cc. portions of chlorobenzene. The combined organic layers are dried over anhydrous sodium sulfate, filtered and evacuated to dryness in vacuo. The desired product is obtained as a residue.

What is claimed is:

1. A process for preparing a compound having the formula:

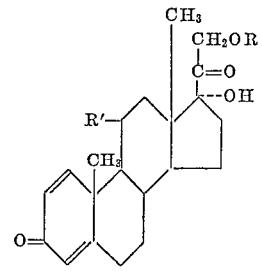

wherein R is selected from the group consisting of hydrogen and acyl hydrocarbon groups containing up to eight carbon atoms, and R' is selected from the group consisting of hydrogen, hydroxyl and keto, which process comprises subjecting a compound having the formula:

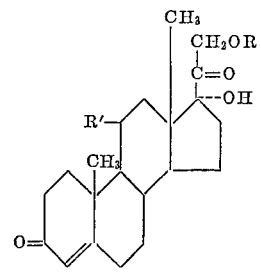

to the following sequence of reactions: (a) treatment with bromine, (b) treatment of the 2,6-dibromide thereby obtained with an organic base, and (c) hydrogenation of the triene compound thereby obtained by reaction with an agent selected from the group consisting of zinc plus acetic acid and hydrogen plus a palladium catalyst.

2. A process for preparing a compound having the formula:

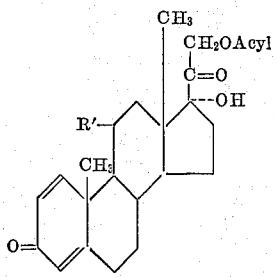

wherein Acyl is an acyl hydrocarbon group containing up to eight carbon atoms, and R' is selected from the group consisting of hydrogen, hydroxyl and keto, which process comprises hydrogenating a compound having the formula:

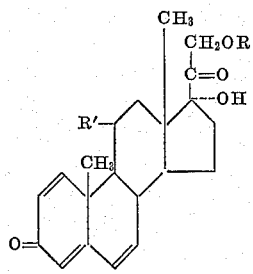

by treatment with zinc and acetic acid.

3. A compound having a formula selected from the group consisting of

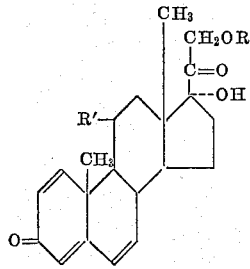

and

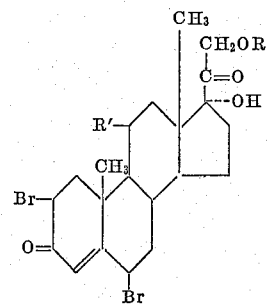

wherein R is selected from the group consisting of hydrogen and acyl hydrocarbon groups containing up to eight carbon atoms, and R' is selected from the group consisting of β-hydroxyl and keto.

4. $\Delta^4$ - 2,6 - dibromo - pregnene - 11β,17α,21 - triol - 3,20-dione.

5. $\Delta^4$-2,6-dibromo-pregnene-17α,21-diol-3,11,20-trione.

6. $\Delta^{1,4,6}$ - pregnatriene - 11β,17α,21 - triol - 3,20 - dione 21-acetate.

7. A compound of the formula:

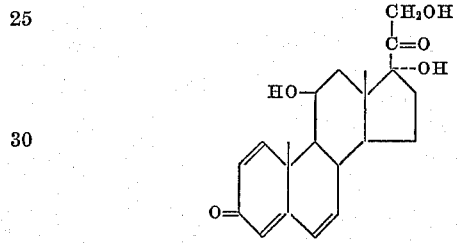

8. A compound of the formula:

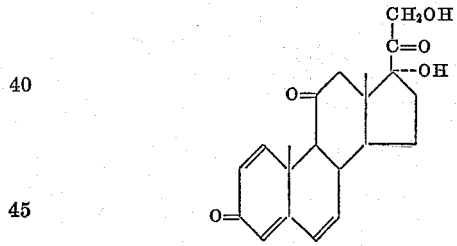

References Cited by the Examiner
UNITED STATES PATENTS
2,735,855   2/56   Djerassi _____ 260—397.45

LEWIS GOTTS, *Primary Examiner.*

B. E. LANHAM, *Examiner.*